United States Patent
Ohira et al.

(10) Patent No.: US 10,471,991 B2
(45) Date of Patent: Nov. 12, 2019

(54) PARKING ASSISTANCE DEVICE AND PROGRAM

(71) Applicant: AISIN SEIKI KABUSHIKI KAISHA, Kariya-shi, Aichi-ken (JP)

(72) Inventors: Tetsuya Ohira, Anjo (JP); Takashi Iwata, Obu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/057,941

(22) Filed: Aug. 8, 2018

(65) Prior Publication Data
US 2019/0061740 A1    Feb. 28, 2019

(30) Foreign Application Priority Data
Aug. 22, 2017    (JP) .................. 2017-159551

(51) Int. Cl.
*B62D 15/02*    (2006.01)
*B60W 30/06*    (2006.01)

(52) U.S. Cl.
CPC .......... *B62D 15/027* (2013.01); *B60W 30/06* (2013.01); *B60W 2550/00* (2013.01); *B60W 2720/10* (2013.01)

(58) Field of Classification Search
CPC combination set(s) only.
See application file for complete search history.

(56) References Cited

U.S. PATENT DOCUMENTS

| 9,862,416 B2 | 1/2018 | Imai et al. | |
| 2007/0027598 A1* | 2/2007 | Mori | B60W 10/06 701/41 |
| 2015/0367845 A1 | 12/2015 | Sannodo et al. | |
| 2015/0375740 A1* | 12/2015 | Okamura | B60W 30/06 701/25 |

FOREIGN PATENT DOCUMENTS

| EP | 2957474 A1 | 12/2015 |
| JP | 2015-081022 A | 4/2015 |
| JP | 2018-020590 A | 2/2018 |

OTHER PUBLICATIONS

Communication dated Jan. 22, 2019, from European Patent Office in counterpart application No. 18190059.8.

* cited by examiner

*Primary Examiner* — Thomas G Black
*Assistant Examiner* — Ana D Thomas
(74) *Attorney, Agent, or Firm* — Sughrue Mion, PLLC

(57) ABSTRACT

A parking assistance device that performs parking assistance when parking a vehicle in a parking area, includes: a speed calculation unit that calculates a first target vehicle speed for each control cycle indicating a cycle for calculating a target vehicle speed set as a target of a vehicle speed of the vehicle based on a target distance for the vehicle to move to a target position and the control cycle, the target position being included in the parking area; and a control unit that controls the vehicle such that the vehicle speed becomes the calculated first target vehicle speed for each control cycle.

4 Claims, 11 Drawing Sheets

PARKING ASSISTANCE DEVICE AND PROGRAM

CROSS REFERENCE TO RELATED APPLICATIONS

This application is based on and claims priority under 35 U.S.C. § 119 to Japanese Patent Application 2017-159551, filed on Aug. 22, 2017, the entire contents of which are incorporated herein by reference.

TECHNICAL FIELD

An embodiment of this disclosure relates to a parking assistance device and a program.

BACKGROUND DISCUSSION

In the related art, a parking assistance device that controls a vehicle to park in a parking area is known. The parking assistance device calculates a moving route to the parking area and steers the vehicle according to the moving route, and guides the vehicle to the parking area.

In recent years, an autonomous parking assistance control in which a brake control and an acceleration/deceleration control are performed in addition to a steering control when the parking assistance device guides the vehicle to the parking area. JP 2015-81022 is an example of the related art.

In the acceleration/deceleration control for guiding the vehicle to the parking area in the autonomous parking assistance in the related art, values of the acceleration and the deceleration are often set in advance. If the values of the acceleration and the deceleration are set in advance, it is difficult to precisely adjust the speed. Therefore, it is difficult to stop the vehicle in the parking area with high accuracy. For example, in the autonomous parking assistance, even if the acceleration/deceleration can be switched at every predetermined control cycle, in the acceleration/deceleration control using the acceleration and deceleration values set in advance, since a difference between a stop position according to the acceleration and the deceleration and a target parking position cannot be adjusted, it is difficult to stop the vehicle in the parking area with high accuracy.

Thus, a need exists for a parking assistance device and a program which is not susceptible to the drawback mentioned above.

SUMMARY

A parking assistance device according to an aspect of this disclosure performs parking assistance when parking a vehicle in a parking area, and includes a speed calculation unit that calculates a first target vehicle speed for each control cycle indicating a cycle for calculating a target vehicle speed set as a target of a vehicle speed of the vehicle based on a target distance for the vehicle to move to a target position and the control cycle, the target position being included in the parking area, and a control unit that controls the vehicle such that the vehicle speed becomes the calculated first target vehicle speed for each control cycle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view illustrating a state in which a part of a cabin of a vehicle according to an embodiment is seen through;

DETAILED DESCRIPTION

Hereinafter, an embodiment will be described with reference to the drawings. Configurations of the embodiment described below and actions and results (effects) brought about by the configurations are merely examples and are not limited to the contents described below.

Figure 1:
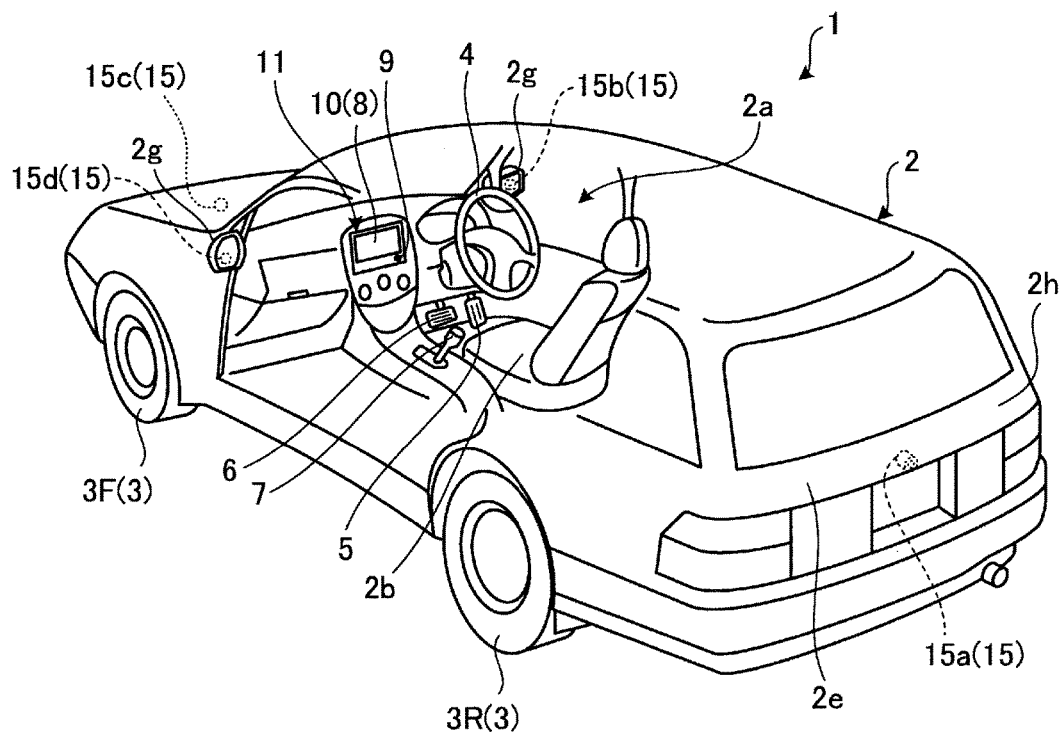
Figure 2:
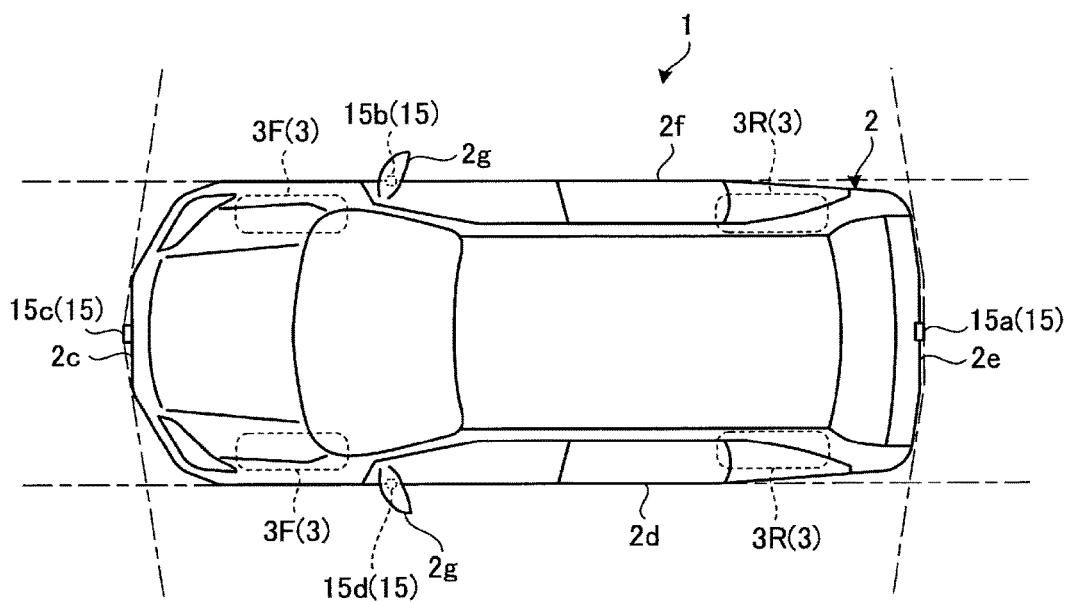
FIG. 2 is an exemplary plan view (bird's-eye view) of the vehicle according to the embodiment.

First, schematic configurations of a vehicle 1 according to the embodiment will be described with reference to FIG. 1 and FIG. 2. FIG. 1 is a schematic and exemplary perspective view illustrating a state in which a part of a cabin 2a of the vehicle 1 according to the embodiment is seen through. In addition, FIG. 2 is a schematic and exemplary plan view (bird's-eye view) illustrating an appearance of the vehicle 1 according to the embodiment seen from the top.

As illustrated in FIG. 1, the vehicle 1 according to the embodiment includes the cabin 2a in which occupants including a driver as a user are on board. In the cabin 2a, a steering section 4, an acceleration operation section 5, a brake operation section 6, a transmission shift operation section 7, and the like are provided in a state in which the user can perform the operation on a seat 2b.

The steering section 4 is a steering wheel protruding from a dashboard (instrument panel). The acceleration operation section 5 is an accelerator pedal positioned under the driver's feet. The brake operation section 6 is a brake pedal positioned under the driver's feet. The transmission shift operation section 7 is a shift lever protruding from a center console.

In the cabin 2a, a display device (monitor device) 11 including a display 8 that can output various images and an audio output device 9 that can output various sounds is provided. The display device 11 is provided at the center portion in the vehicle width direction (lateral direction) of the dashboard in the cabin 2a. The display 8 is configured with a liquid crystal display (LCD), an organic electroluminescent display (OELD) and the like, and for example, and can display a surroundings image representing a situation around the vehicle 1. Specific examples of the surroundings image will be described later, and an overhead image in which the situation around the vehicle 1 is viewed from the top in an overhead view can be included as an example of the surroundings image.

Here, in an area in the display 8 according to the embodiment where the image is displayed, that is, a display screen, a touch panel 10 that can detect coordinates of a position on the display screen, to which a pointer such as a finger or a stylus approaches (including contacts), is provided. In this way, the user (driver) can visually recognize the image displayed on the display screen of the display 8 and it is possible to perform various operation inputs by performing an input operation (for example, touch (tap) operation) using the pointer on the touch panel 10.

In the embodiment, the display device 11 may have various physical operation input units such as switches, dials, joysticks, pushbuttons and the like. In addition, in the embodiment, another audio output device may be provided at a position different from the position of the display device 11 in the cabin 2a. In this case, it is possible to output various kinds of sound information from both the audio output device 9 and other audio output devices. In addition, in the embodiment, the display device 11 may be configured capable of displaying information relating to various systems such as a navigation system and an audio system.

As illustrated in FIG. 1 and FIG. 2, the vehicle 1 according to the embodiment is a four wheel vehicle having two front vehicle wheels 3F on the right and left and two rear vehicle wheels 3R on the right and left. Hereinafter, for the sake of simplicity, in some cases, the front vehicle wheels 3F and the rear vehicle wheels 3R may be collectively referred to as vehicle wheels 3. In the embodiment, a sideslip angle of a part or all of the four vehicle wheels 3 change (steer) according to the steering performed by the steering section 4 and the like.

The vehicle 1 includes a plurality of (four in the examples of FIG. 1 and FIG. 2) imaging units 15a to 15d. The imaging unit 15a is provided at an end portion 2e at a rear side of a vehicle body 2 (for example, under a door 2h of a rear trunk), and images an area behind the vehicle 1. In addition, the imaging unit 15b is provided on the door mirror 2g at an end portion 2f at the right side of the vehicle body 2, and images the area on the right side of the vehicle 1. In addition, the imaging unit 15c is provided at an end portion 2c (for example, on a front bumper) at the front side of the vehicle body 2, and images an area in front of the vehicle 1. In addition, the imaging unit 15d is provided on a door mirror 2g at an end portion 2d at the left side of the vehicle body 2, and images the area on the left side of the vehicle 1. Hereinafter, for the sake of simplicity, in some cases, the imaging units 15a to 15d may be collectively referred to as an imaging unit 15.

The imaging unit 15 is a so-called digital camera including an imaging device such as a charge coupled device (CCD) or a complementary metal oxide semiconductor (CMOS) image sensor (CIS) or the like. The imaging unit 15 performs imaging the surroundings of the vehicle 1 at a predetermined frame rate, and outputs image data of the captured image obtained by imaging.

The image data obtained by the imaging unit 15 can constitute a moving image as a frame image. In addition, the image data obtained by the imaging unit 15 can be used for detecting a three-dimensional object existing around the vehicle 1. The three-dimensional object described here includes a stationary object such as another parked vehicle and a moving object such as a moving pedestrian. Furthermore, the image data obtained by the imaging unit 15 can also be used for detecting a parking area where the vehicle 1 can park. The parking area may be an area explicitly partitioned by a parking frame such as a white line or the like or may be an area not explicitly partitioned by the white line or the like as long as the area has a size sufficient for the vehicle 1 to park.

In the embodiment, as a configuration for sensing the situation around the vehicle 1, a distance sensor for detecting (calculating and specifying) a distance to the three-dimensional object existing around the vehicle 1 may be provided in addition to the above-described imaging unit 15. As such a distance sensor, for example, a laser distance sensor which emits light such as laser light and receives light reflected from the three-dimensional object existing around the vehicle 1 is used.

Figure 3:
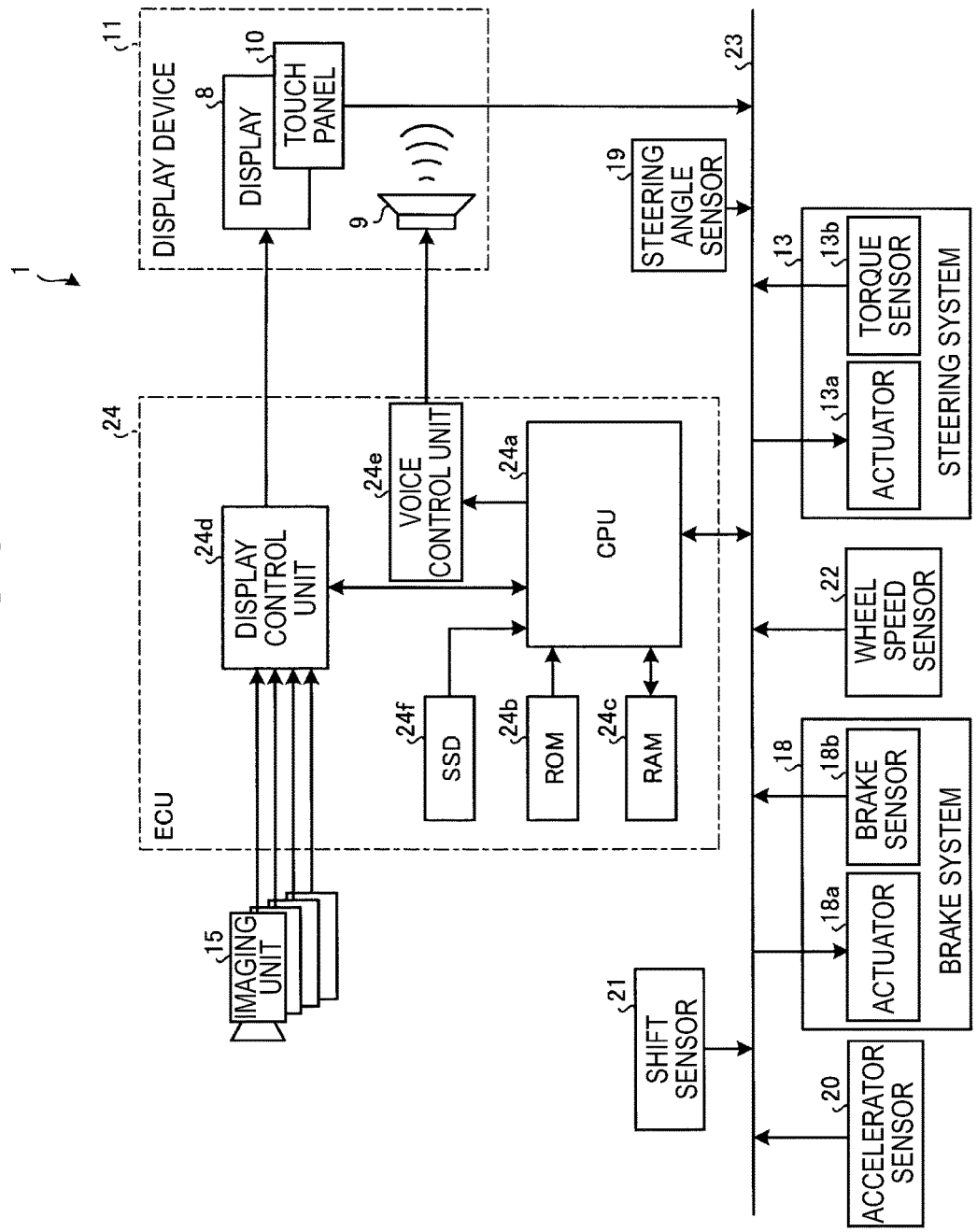
FIG. 3 is a schematic and exemplary block diagram illustrating an internal configuration of the vehicle according to the embodiment.

Next, an internal configuration of the vehicle 1 according to the embodiment will be described with reference to FIG. 3. FIG. 3 is a schematic and exemplary block diagram illustrating the internal configuration of the vehicle 1 according to the embodiment.

As illustrated in FIG. 3, in the vehicle 1 according to the embodiment, a display device 11, a steering system 13, an imaging unit 15, a brake system 18, a steering angle sensor 19, an accelerator sensor 20, a shift sensor 21, a vehicle wheel speed sensor 22, and an electronic control unit (ECU) 24 are provided.

The various configurations described above (the display device 11, the steering system 13, the brake system 18, the steering angle sensor 19, the accelerator sensor 20, the shift sensor 21, the vehicle wheel speed sensor 22 and the ECU 24) are electrically connected to each other via an in-vehicle network 23. The in-vehicle network 23 is an electric communication line configured with, for example, a controller area network (CAN).

The steering system 13 is an electric power steering system, a steer by wire (SBW) system, or the like. The steering system 13 includes an actuator 13a and a torque sensor 13b. The steering system 13 steers a part or all of the vehicle wheels 3 by operating the actuator 13a under the control by the ECU 24 and the like which will be described later. The torque sensor 13b detects the torque generated according to the operation of the steering section 4 performed by the driver, and transmits the result of detection to the ECU 24.

The brake system 18 includes an anti-lock brake system (ABS), a side slip prevention device (ESC), an electric power brake system, a brake by wire (BBW), and the like. The brake system 18 includes an actuator 18a and a brake sensor 18*b*. The brake system 18 applies the braking force to the vehicle wheels 3 by operating the actuator 18*a* under the control by the ECU 24 and the like which will be described later. The brake sensor 18*b* detects a position (displacement) of the brake pedal as the movable part in the brake operation section 6, and transmits the result of detection to the ECU 24.

The steering angle sensor 19 is a sensor that detects an amount of operation of the steering section 4 performed by the driver. For example, the steering angle sensor 19 is configured with a Hall element or the like, detects the rotation angle of the rotating portion of the steering section 4 as a steering amount, and then, transmits the result of detection to the ECU 24. In addition, the accelerator sensor 20 detects a position (displacement) of the accelerator pedal as a movable part in the acceleration operation section 5, and transmits the result of detection to the ECU 24.

The shift sensor 21 detects a position of the movable part such as the shift lever in the transmission shift operation section 7, and transmits the result of detection to the ECU 24. In addition, the vehicle wheel speed sensor 22 detects a rotation amount of the vehicle wheels 3, the rotation speed of the vehicle wheels 3 per unit time, or the like, and transmits the result of detection to the ECU 24.

The ECU 24 has a hardware configuration same as that of a usual computer such as a central processing unit (CPU) 24*a*, a read only memory (ROM) 24*b*, a random access memory (RAM) 24*c*, a display control unit 24*d*, an audio control unit 24*e*, and a solid state drive (SSD).

The CPU 24*a* is a control unit that controls the entire vehicle 1. The CPU 24*a* reads a program stored in a storage device such as the ROM 24*b* or the SSD 24*f* and operates in accordance with a command included in the program, and then, performs various processing items. The RAM 24*c* is used, for example, as a work area when the CPU 24*a* performs various processing items.

The display control unit 24*d* controls the image output via the display 8. In addition, the audio control unit 24*e* controls the audio output via the audio output device 9.

In the ECU 24 according to the embodiment, the CPU 24*a*, the ROM 24*b* and the RAM 24*c* may be mounted on one integrated circuit. In addition, in the ECU 24 according to the embodiment, a processor such as a digital signal processor (DSP), a logic circuit, or the like may be provided instead of the CPU 24*a* as a control unit for controlling the entire vehicle 1. In addition, in the embodiment, a hard disk drive (HDD) may be provided instead of the SSD 24*f* (or in addition to the SSD 24*f*) as a main storage device for storing a program executed by the CPU 24*a*. Furthermore, in the embodiment, an external device connected to the ECU 24 may include the SSD 24*f* as the main storage device.

With the above-described configuration, the ECU 24 performs overall controls on each part of the vehicle 1 by transmitting the control signals to each part of the vehicle 1 via the in-vehicle network 23. At this time, the image data obtained from the imaging unit 15 and the result of detection performed by various sensors acquired via the in-vehicle network 23 can be used by the ECU 24 for the controls. The various sensors are the torque sensor 13*b*, the brake sensor 18*b*, the steering angle sensor 19, the accelerator sensor 20, the shift sensor 21, the vehicle wheel speed sensor 22, and the like described above. In addition, the information on the input operation using the touch panel 10, which is acquired via the in-vehicle network 23, can also be used by the ECU 24 for the controls.

In the present embodiment, the ECU 24 is configured so as to realize a parking operation for the vehicle 1 to park in the parking area by controlling the steering system 13, the brake system 18, and the transmission shift operation section 7. For example, the ECU 24 obtains the parking area existing on the road surface around the vehicle 1 based on the image data obtained from the imaging unit 15, and sets a target parking position in the parking area. Then, the ECU 24 performs autonomous parking assistance control to move the vehicle 1 to the target parking position by steering, braking, and acceleration/deceleration control of the vehicle 1 to the target parking position.

Figure 4:
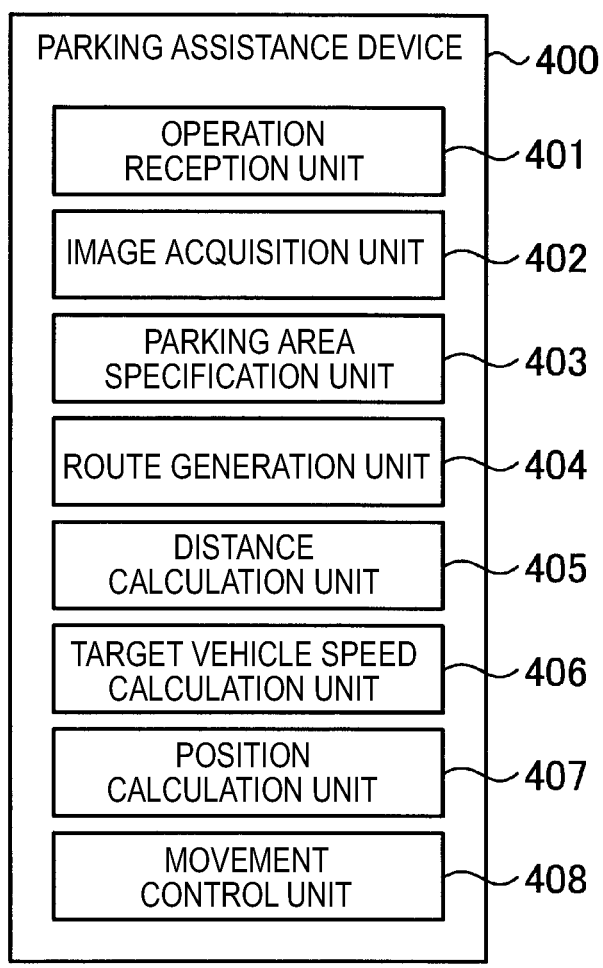
FIG. 4 is an exemplary block diagram illustrating a functional configuration of a parking assistance device according to the embodiment.

FIG. 4 is an exemplary block diagram illustrating a functional configuration of the parking assistance device 400 according to the embodiment. The parking assistance device 400 is a functional module group realized in the ECU 24 as a result of execution of predetermined software (a control program) stored in the ROM 24*b*, the SSD 24*f*, and the like by the CPU 24*a* of the ECU 24. In the embodiment, a part or all of the functional module group illustrated in FIG. 4 may be realized by dedicated hardware (circuit).

As illustrated in FIG. 4, the parking assistance device 400 includes an operation receiving unit 401, an image acquisition unit 402, a parking area specification unit 403, a route generation unit 404, a distance calculation unit 405, a target vehicle speed calculation unit 406, a position calculation unit 407, and a movement control unit 408.

The operation receiving unit 401 receives an operation input from the user via the touch panel 10 or the like. For example, the operation receiving unit 401 receives a touch operation which is an operation of touching a position (area) on the touch panel 10 or a long press operation which is an operation of continuously pressing the touch operation for a predetermined time or more, and the like via the touch panel 10. In this way, the operation receiving unit 401 receives a parking assistance start operation of the vehicle 1 or a selection operation if a plurality of parking areas exist.

Furthermore, the operation receiving unit 401 receives an operation input as to whether or not the brake pedal is depressed from the brake sensor 18*b*.

The image acquisition unit 402 acquires the data of captured image output from a plurality of imaging units 15 that image the surroundings of the vehicle 1.

The parking area specification unit 403 detects a white line or the like appearing in the data of captured image based on the data of captured image acquired by the image acquisition unit 402. The parking area specification unit 403 specifies a parking area where the vehicle 1 can park while taking a parking frame detectable from the detected white line or the like and the size of the vehicle 1 into consideration, and then, specifies a target parking position which is a target for guiding the vehicle 1 to the parking area.

The route generation unit 404 generates a moving route for guiding the vehicle 1 from the current position of the vehicle 1 to the target parking position included in the parking area. In the present embodiment, an example in which the route generation unit 404 generates a moving route to guide the vehicle 1 to the target parking position included in the parking area is described, however, a turning back position may be included, to which the vehicle 1 repeats to turn backward and forward until the vehicle 1 reaches the target parking position.

The distance calculation unit 405 calculates a target distance representing a distance on the moving route from the current position of the vehicle 1 to the target parking position, which is generated by the route generation unit 404.

Figure 5:
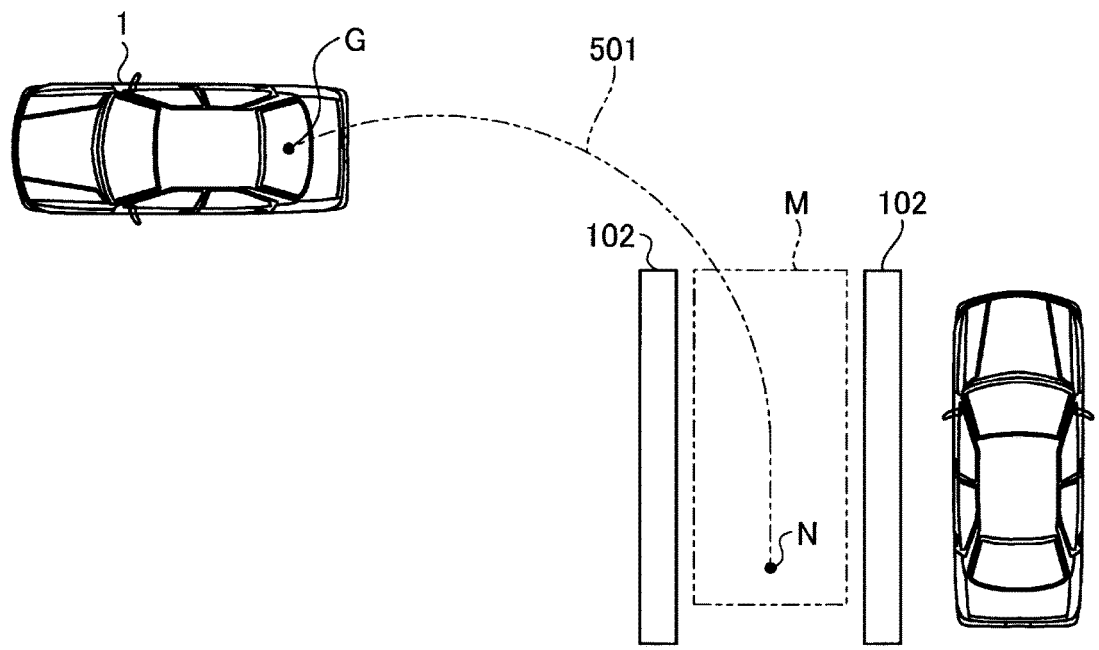
FIG. 5 is an exemplary diagram illustrating a moving route generated by the parking assistance device according to the embodiment.

FIG. 5 is an exemplary diagram illustrating a moving route generated by the parking assistance device 400 in the present embodiment. In FIG. 5, the parking area specification unit 403 detects white lines 102 based on the data of captured image acquired by the image acquisition unit 402. The parking area specification unit 403 specifies a parking area M from the result of detection of the white lines 102, and then, specifies a target parking position N for the vehicle 1 to park in the parking area M. In the present embodiment, for example, a center position of a line connecting the left and right rear vehicle wheels 3R of the vehicle 1 is set as a reference position G, and a position where the reference position G reaches is the target parking position N.

The route generation unit 404 generates a moving route 501 for guiding the reference position G of the vehicle 1 to the target parking position N. The distance calculation unit 405 calculates a target distance of the moving route 501. In the present embodiment, the parking assistance device 400 performs steering, braking, and acceleration/deceleration control so as to move the vehicle 1 as much as the calculated target distance. In the present embodiment, the brake and acceleration/deceleration control is mainly described, but steering control according to a moved distance of the vehicle 1 is also assumed to be performed.

In the present embodiment, the target vehicle speed calculation unit 406 calculates the target vehicle speed based on the movement distance and the like, and the movement control unit 408 performs control so as to move the vehicle 1 as much as the calculated target distance by controlling the vehicle 1 such that the vehicle speed becomes the target vehicle speed. The target vehicle speed is a vehicle speed calculated for each control cycle and is a vehicle speed set as the target of the vehicle speed within the control cycle.

Figure 6:
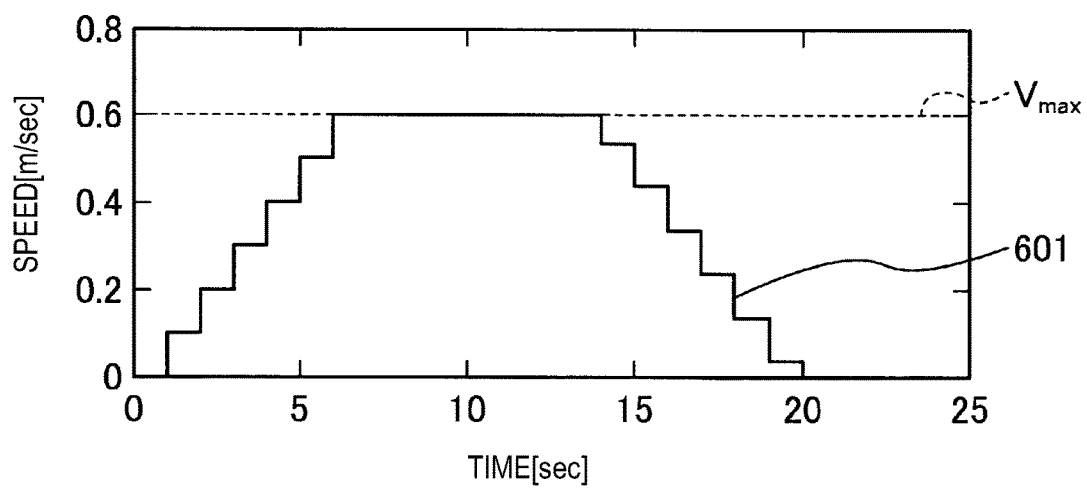
FIG. 6 is an exemplary diagram illustrating a relationship between a target vehicle speed and an elapsed time set by the parking assistance device in the related art.

FIG. 6 is an exemplary diagram illustrating a relationship between a target vehicle speed and an elapsed time set by the parking assistance device in the related art. In the example illustrated in FIG. 6, it is assumed that a target distance is 8 m and a control cycle Ts is 1 second. The target vehicle speed calculation unit 406 calculates the target vehicle speed for each control cycle Ts (1 second).

In the example illustrated in FIG. 6, it is assumed that a set acceleration $a_{plus}$ of the vehicle is 0.1, a set deceleration $a_{minus}$ is −0.1, and a maximum vehicle speed at the parking assistance control of the vehicle 1 is $V_{max}$. The set acceleration $a_{plus}$ and the set deceleration $a_{minus}$ are assumed to be the acceleration and deceleration set such that the vehicle can output when the parking assistance is performed.

In the example illustrated in FIG. 6, at the time of acceleration of the vehicle, the parking assistance device increases the target vehicle speed in accordance with the set acceleration $a_{plus}$ (0.1 m/sec) for each control cycle Ts (1 second). Thereafter, the parking assistance device sets the maximum vehicle speed $V_{max}$ as the target vehicle speed and moves the vehicle at the target vehicle speed. Thereafter, at the time of deceleration of the vehicle, the parking assistance device reduces the target vehicle speed in accordance with the set deceleration $a_{minus}$ (−0.1 m/sec) that can be output when the parking assistance is performed for every control cycle Ts (1 second).

Figure 7:
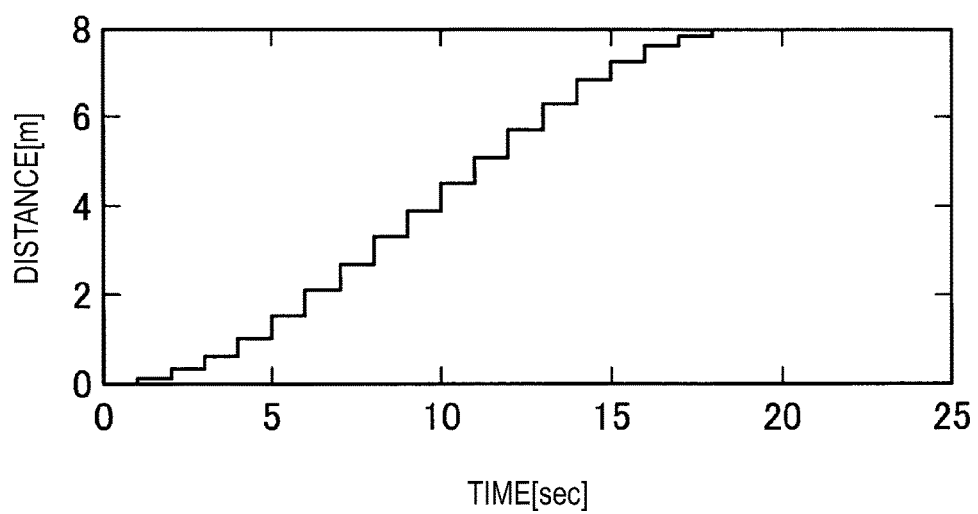
FIG. 7 is a diagram illustrating a movement distance when the vehicle is moved at the target vehicle speed illustrated in FIG. 6.

FIG. 7 is a diagram illustrating a movement distance when the vehicle is moved at the target vehicle speed illustrated in FIG. 6. In the example illustrated in FIG. 7, the movement distance can be calculated by integrating the target vehicle speed illustrated in FIG. 6 (area of the stair-shaped waveform indicated by a vehicle speed change 601 illustrated in FIG. 6). In the example illustrated in FIG. 7, it is indicated that the vehicle can reach the target distance (8 m) by controlling the vehicle to move at the target vehicle speed illustrated in FIG. 6.

Figure 8:
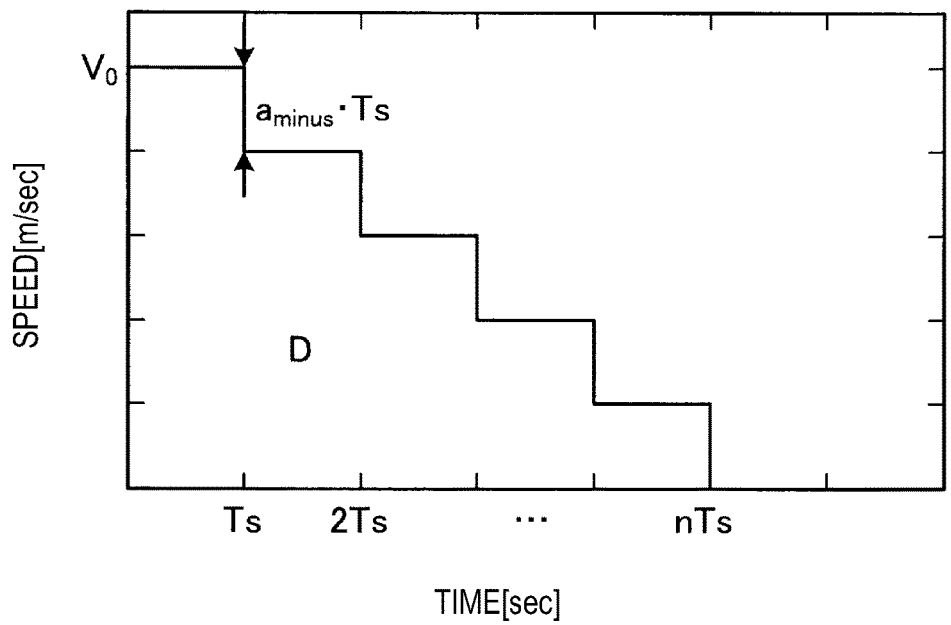
FIG. 8 is an exemplary diagram illustrating a change of the vehicle speed at the time of deceleration of the vehicle.

FIG. 8 is an exemplary diagram illustrating a change of the vehicle speed at the time of deceleration of the vehicle. As illustrated in FIG. 8, a movement distance D from the current vehicle position to the stop position of the vehicle at the time of deceleration of the vehicle is calculated by Equation (1).

$$D = \tfrac{1}{2}(a_{minus} \cdot Ts^2 n(n+1)) \tag{1}$$

The number of times n is the number of times that the vehicle speed can be adjusted until the vehicle reaches the movement distance D when deceleration is performed based on the set deceleration $a_{minus}$ for each control cycle Ts. The number of times n can be calculated by Equation (2) derived from Equation (1). That is, if a target distance $D_0$ to the target parking position of the vehicle is calculated, the number of times n can be calculated from Equation (2).

$$n = \left\lfloor \frac{\sqrt{1 + \frac{8 D_0}{a_{minus} \cdot Ts}}}{2} \right\rfloor \tag{2}$$

Equation (2) is a floor function in which the integer part is picked by removing the decimal part. A target vehicle speed $V_1$ obtained by decelerating the vehicle at the set deceleration $a_{minus}$ in the number of times n calculated by Equation (2) to stop the vehicle is calculated by Equation (3).

$$V_1 = a_{minus} \cdot Ts \cdot n \tag{3}$$

In the present embodiment, for the sake of easy explanation, an example of calculating the target vehicle speed for each control cycle Ts (1 second) is described, but the time length of the control cycle Ts is not particularly limited. For example, it is conceivable that the control cycle Ts is set to be several tens of m/sec.

By the way, in the present embodiment, there is a restriction (discretization) that the target vehicle speed can be updated only in every control cycle. Therefore, when the acceleration/deceleration is performed at the set acceleration $a_{plus}$ 0.1 and the set deceleration $a_{minus}$ −0.1 in the number of times n to adjust the target vehicle speed, it is difficult to stop the vehicle 1 just at the target distance $D_0$. In other words, since the decimal part is removed in Equation (2), even if the movement is started at the target vehicle speed $V_1$ calculated by Equation (3), it is difficult to stop just at the target distance $D_0$. Next, a deviation between the target distance $D_0$ and the actual stop position of the vehicle 1 will be described.

Figure 9:
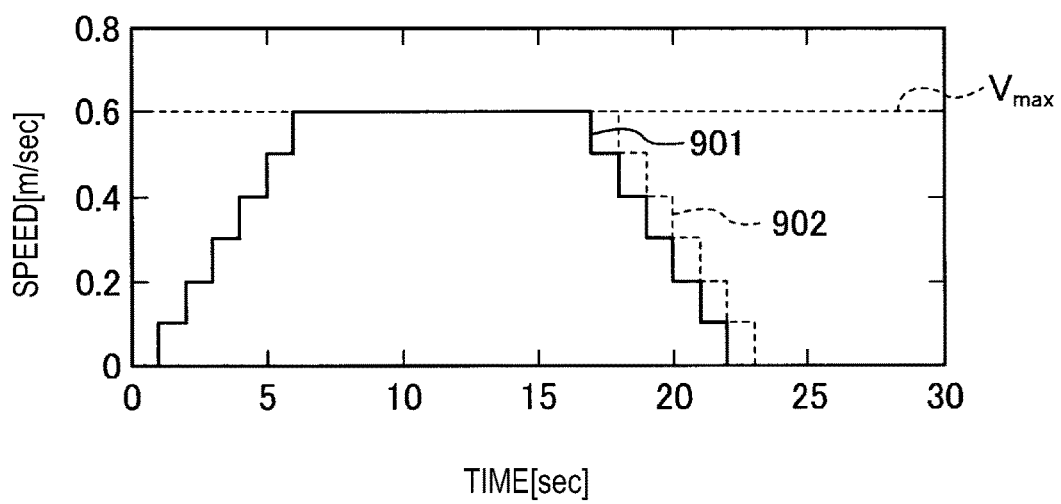
FIG. 9 is an exemplary diagram illustrating the relationship between the target vehicle speed and the elapsed time set by the parking assistance device in the related art.

FIG. 9 is an exemplary diagram illustrating a relationship between the target vehicle speed and the elapsed time set by the parking assistance device in the related art. In the example illustrated in FIG. 9, for the target vehicle speed, a first vehicle speed change 901 and a second vehicle speed change 902 are illustrated. The first vehicle speed change 901 is an example of deceleration from the 18th cycle and the second vehicle speed change 902 is an example of the deceleration from the 19th cycle.

Figure 10:
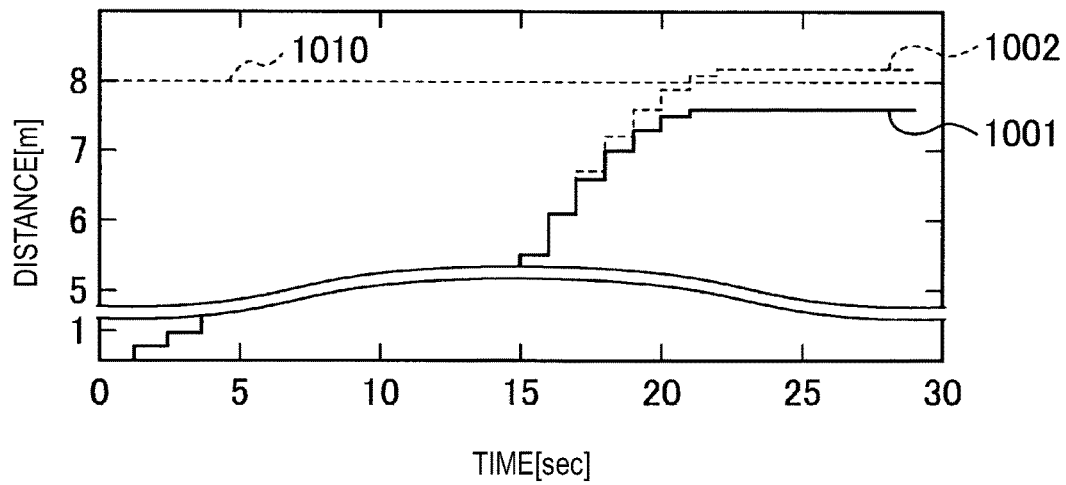
FIG. 10 is an exemplary diagram illustrating the movement distance when the vehicle is moved at the target vehicle speed illustrated in FIG. 9.

FIG. 10 is an exemplary diagram illustrating the movement distance when the vehicle is moved at the target vehicle speed illustrated in FIG. 9. In FIG. 10, A movement distance 1001 calculated by integrating the target vehicle speed indicated by the first vehicle speed change 901 and a movement distance 1002 calculated by integrating the target vehicle speed indicated by the second vehicle speed change 902 are illustrated.

At a final position of the movement distance 1001, the vehicle does not reach the target distance 1010, and at a final position of the movement distance 1002, the vehicle exceeds the target distance 1010. As illustrated above, if the target vehicle speed is adjusted at units of the set acceleration $a_{plus}$ 0.1 and the set deceleration $a_{minus}$-0.1 for every control cycle Ts, a deviation occurs between the target parking position and the actual stop position of the vehicle.

In addition, the vehicle can get closer to the target parking position by performing an acceleration inversion, but it is not preferable due to the anxiety and discomfort to the occupants. In addition, even if the acceleration inversion is performed, it is difficult to stop the vehicle 1 just at the target parking position.

Therefore, the target vehicle speed calculation unit 406 in the present embodiment calculates the target vehicle speed for each control cycle Ts based on the target distance for the vehicle 1 to move to the target parking position, the control cycle Ts indicating a cycle for calculating the target vehicle speed of the vehicle 1, and the set acceleration (for example, including set acceleration $a_{plus}$ 0.1 and the set deceleration $a_{minus}$-0.1) set such that the vehicle can output when the parking assistance is performed. In the example illustrated in FIG. 9 and FIG. 10, since the target vehicle speed is calculated for each control cycle Ts based on the set acceleration $a_{plus}$ 0.1 and the set deceleration $a_{minus}$-0.1, the deviation occurs between the target parking position and the actual stop position of the vehicle. In contrast, in the present embodiment, since the target vehicle speed calculation unit 406 calculates the target vehicle speed considering not only the control cycle Ts and the set acceleration but also the target distance, it is possible to stop the vehicle just at the target parking position.

The target vehicle speed calculation unit 406 in the present embodiment calculates a vehicle speed offset amount for adjusting the target vehicle speed so as to stop the vehicle just at the target parking position based on the based on the difference between the movement distance of the vehicle 1 and the target distance in a case of deceleration at the set deceleration $a_{minus}$. In other words, in the present embodiment, compared to that in the related art, it is possible to stop the vehicle just at the target parking position by adjusting the target vehicle speed considering the target distance.

Figure 11:
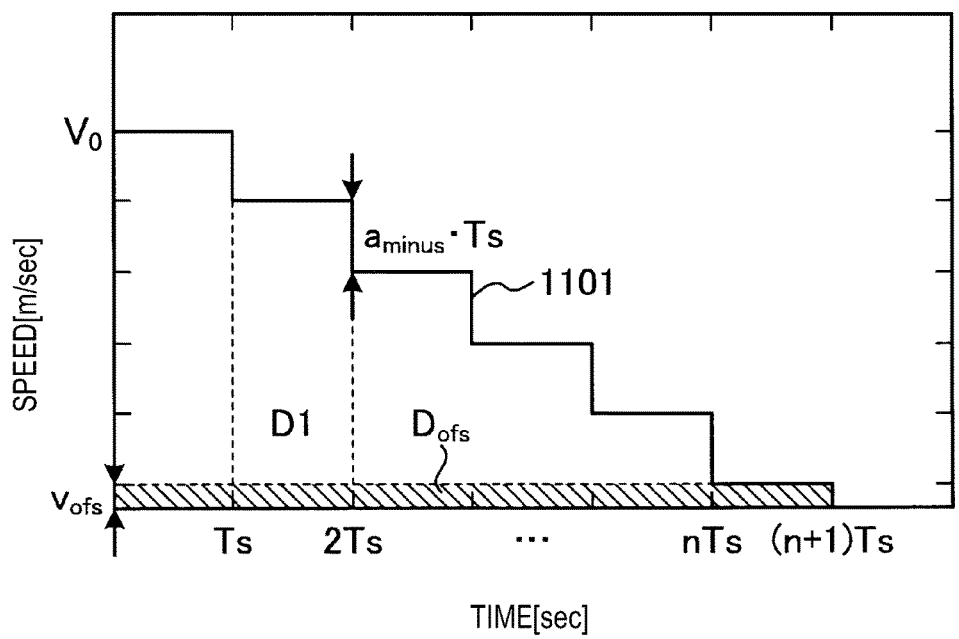
FIG. 11 is an exemplary diagram illustrating a vehicle speed offset amount at the time of deceleration of the vehicle.

FIG. 11 is an exemplary diagram illustrating a vehicle speed offset amount at the time of deceleration of the vehicle 1. In the example illustrated in FIG. 11, it is indicated that stopping the vehicle just at the target parking position is realized by adding the vehicle speed offset amount to the vehicle speed calculated based on the control cycle Ts and the set deceleration $a_{minus}$.

That is, as illustrated in the vehicle speed change 1101, the target vehicle speed calculation unit 406 calculates a movement distance D1 for the vehicle 1 to be moved until the vehicle 1 stops, based on the control cycle Ts and the set deceleration $a_{minus}$ when decelerating for each control cycle Ts according to the set deceleration $a_{minus}$. In the example illustrated in FIG. 11, the integral value of the vehicle speed change 1101 is the movement distance.

In order to calculate the movement distance D1, the target vehicle speed calculation unit 406 calculates the number of times n using Equation (2) based on the target distance $D_0$ from the current position of the vehicle 1 to the target parking position, the set deceleration $a_{minus}$, and the control cycle Ts.

Then, the target vehicle speed calculation unit 406 calculates an offset distance $D_{ofs}$ indicating a difference between the movement distance D to the stop position of the vehicle based on Equation (1) when the vehicle speed is decelerated by adjusting the number of times n at the set deceleration $a_{minus}$ and the target distance $D_0$ from Equation (4).

$$D_{ofs} = D_0 - \tfrac{1}{2}(a_{minus} \cdot Ts^2 n(n+1)) \qquad (4)$$

Then, the target vehicle speed calculation unit 406 in the present embodiment calculates the vehicle speed offset amount $v_{ofs}$ for adjusting the offset distance $D_{ofs}$. The target vehicle speed calculation unit 406 uses the vehicle speed offset amount $v_{ofs}$ for calculating a tentative target vehicle speed $V_0$ at the time of deceleration. The vehicle speed offset amount $v_{ofs}$ is calculated from the following Equation (5) below.

$$\begin{aligned} v_{ofs} &= \frac{D_{ofs}}{(n+1)Ts} \\ &= \frac{D_0 - \dfrac{a_{minus} \cdot Ts^2}{2} n(n+1)}{(n+1)Ts} \\ &= \frac{D_0}{(n+1)Ts} - \frac{a_{minus} \cdot n \cdot Ts}{2} \end{aligned} \qquad (5)$$

The target vehicle speed calculation unit 406 calculates the tentative target vehicle speed $V_0$ by adding the vehicle speed offset amount $v_{ofs}$ to the vehicle speed calculated based on the control cycle Ts and the number of times n at the set deceleration $a_{minus}$ at the time of deceleration. The tentative target vehicle speed $V_0$ is calculated using Equation (6) below. The tentative target vehicle speed $V_0$ is a candidate vehicle speed set as a target vehicle speed at the time of deceleration of the vehicle 1.

$$V_0 = a_{minus} \cdot Ts \cdot n + V_{ofs} \qquad (6)$$

The target vehicle speed calculation unit 406 in the present embodiment calculates the tentative target vehicle speed $V_0$ at the time of deceleration using the above-described method. That is, since the target vehicle speed calculation unit 406 in the present embodiment adjusts the tentative target vehicle speed based on the target distance for each control cycle (the calculated vehicle speed offset amount $v_{ofs}$), it is possible to stop the vehicle 1 within the parking area with high accuracy compared that in the related art.

The tentative target vehicle speed $V_0$ is an initial speed for accurately reaching the target distance $D_0$ if the constant deceleration is performed for every control cycle Ts (in other words, if the vehicle is decelerating). In other words, the tentative target vehicle speed $V_0$ is a speed calculated without considering the current vehicle speed of the vehicle 1 and the maximum vehicle speed $V_{max}$ at when the parking assistance is performed. If the difference between the current vehicle speed of the vehicle 1 and the tentative target vehicle speed $V_0$ is large, it is not desirable to use the tentative target vehicle speed $V_0$ as the target vehicle speed as it is.

Therefore, in the present embodiment, it is necessary to calculate the target vehicle speed at the time of acceleration of the vehicle 1 and in the normal-state section as well.

Therefore, the target vehicle speed calculation unit 406 in the present embodiment calculates not only the tentative target vehicle speed $V_0$ at the time of deceleration but also calculates the target vehicle speed at the time of acceleration and in the normal-state section.

For example, the target vehicle speed calculation unit 406, at the time of acceleration, calculates a vehicle speed (hereinafter referred to as an upper limit vehicle speed $V_{lim}$ at the time of acceleration) determined from the set acceleration $a_{plus}$ (which can be output as the upper limit when the parking assistance is performed) using Equation (7) below. The target vehicle speed calculated last time (in other words, the previous control cycle Ts) by the target vehicle speed calculation unit 406 is set as $V_{old}$.

$$V_{lim} = V_{old} + a_{plus} Ts \qquad (7)$$

In the normal-state section, the maximum vehicle speed $V_{max}$ (when the parking assistance control is performed on the vehicle 1) is the target vehicle speed. A target vehicle speed Vr corresponding to the situation of the vehicle 1 is selected from the upper limit vehicle speed $V_{lim}$ at the time of acceleration, the maximum vehicle speed $V_{max}$, and the tentative target vehicle speed $V_0$. In the present embodiment, the target vehicle speed calculation unit 406 derives the target vehicle speed Vr from Equation (8) below.

$$Vr = \min(V_0, V_{max}, V_{lim}) \qquad (8)$$

That is, since the upper limit vehicle speed $V_{lim}$ at the time of acceleration (calculated from the previous target vehicle speed $V_{old}$) becomes lowest at the acceleration section of the vehicle 1, the upper limit vehicle speed $V_{lim}$ at the time of acceleration is set to be the target vehicle speed Vr. When the upper limit vehicle speed $V_{lim}$ at the time of acceleration becomes higher than the maximum vehicle speed $V_{max}$, the maximum vehicle speed Vmax is set to be the target vehicle speed Vr of the vehicle 1. After traveling at the maximum vehicle speed $V_{max}$ in the normal-state section, when the tentative target vehicle speed $V_0$ becomes lower than the maximum vehicle speed $V_{max}$, it is determined that the vehicle needs to decelerate, and thus, the tentative target vehicle speed $V_0$ is set to be the target vehicle speed Vr in the deceleration section. Detailed situation will be described later.

The position calculation unit 407 calculates the target position indicating the position of the vehicle 1 after the next control cycle Ts when the control is performed such that the vehicle speed becomes the calculated target vehicle speed Vr.

Furthermore, the position calculation unit 407 acquires the actual position of the vehicle 1 after the control cycle Ts, based on the signal input from the vehicle wheel speed sensor 22. In the present embodiment, the position of the vehicle 1 is calculated with a point where the parking assistance is started as an origin, but the reference position for calculating the position of the vehicle 1 is not limited.

The movement control unit 408 performs control such that the vehicle speed becomes the target vehicle speed Vr calculated at each control cycle Ts for every control cycle Ts. Furthermore, the movement control unit 408 performs a PID control based on the difference between the calculated current position and the actual position. As a result, it is possible to suppress errors during the movement control of the vehicle 1.

Figure 12:
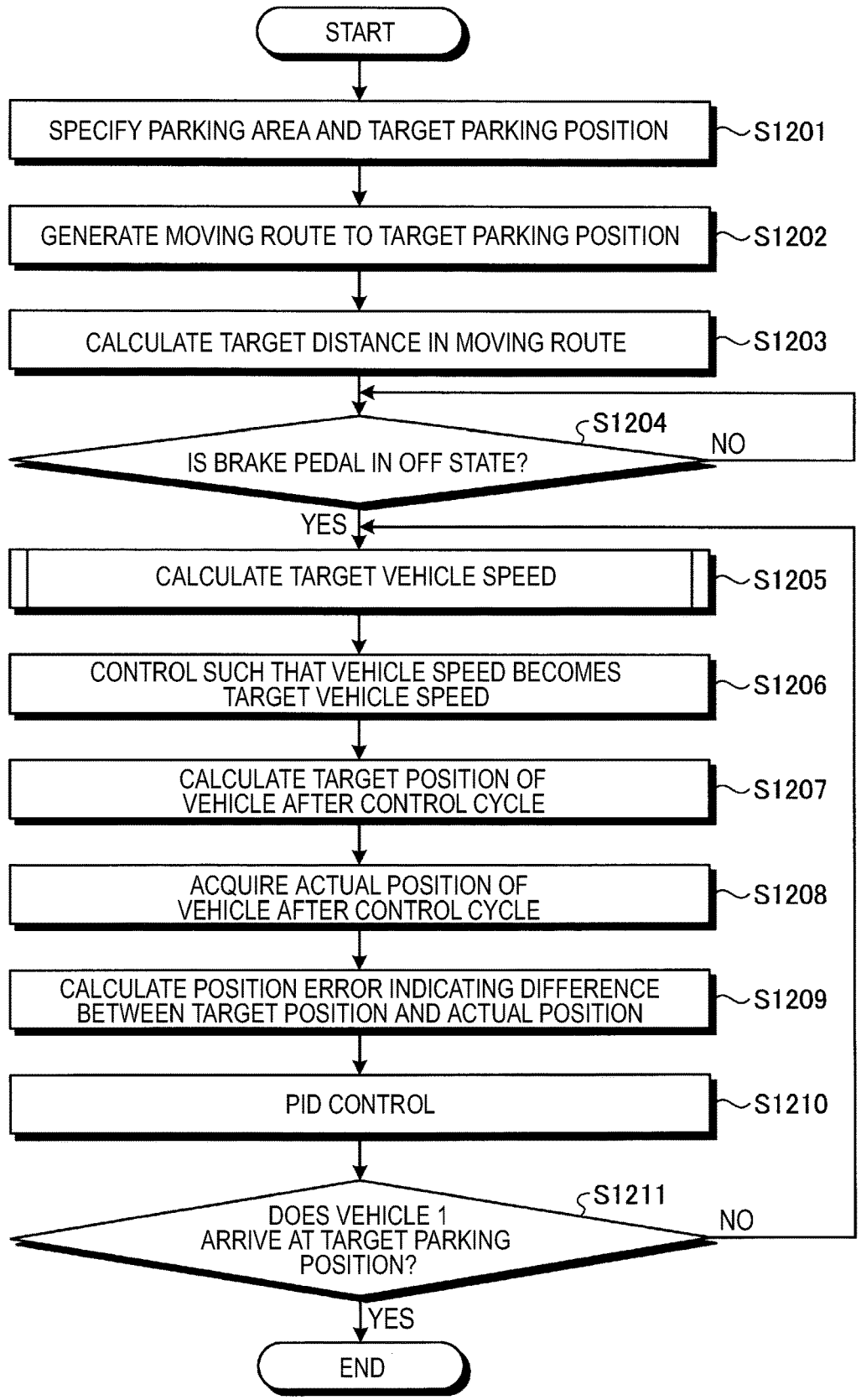
FIG. 12 is a flowchart illustrating a procedure of a parking assistance control in the parking assistance device according to the embodiment.

Next, the parking assistance control by the parking assistance device 400 in the present embodiment will be described. FIG. 12 is a flowchart illustrating a procedure of the parking assistance control by the parking assistance device 400 in the present embodiment.

First, the parking area specification unit 403 specifies a parking area where the vehicle 1 can park based on the data of captured image input from the imaging unit 15, and specifies a target parking position which is a target for guiding the vehicle 1 to the parking area (S1201).

Next, the route generation unit 404 generates a moving route for guiding the vehicle 1 to the target parking position included in the parking area from the current position of the vehicle 1 (S1202).

The distance calculation unit 405 calculates a target distance in the moving route from the current position of the vehicle 1 to the target parking position, which is generated by the route generation unit 404 (S1203).

The operation receiving unit 401 determines whether or not the brake pedal is in OFF state (the foot is released) according to a signal from the brake sensor 18b (S1204). If it is determined that the brake pedal is not in OFF state (pushed by the foot) (No in S1204), the processing is performed again from S1204.

If the operation receiving unit 401 determines that the brake pedal is in OFF state (the foot is released) (Yes in S1204) according to the signal from the brake sensor 18b, the target vehicle speed calculation unit 406 calculates a target vehicle speed of the vehicle 1 (S1205).

The movement control unit 408 performs control such that the vehicle speed becomes the calculated target vehicle speed (S1206).

The position calculation unit 407 calculates a target position indicating the position of the vehicle 1 after the next control cycle Ts when the control is performed such that the vehicle speed becomes the calculated target vehicle speed Vr (S1207). In the present embodiment, the target position is calculated by integrating the change of the target vehicle speed Vr.

Furthermore, the position calculation unit 407 acquires the actual position of the vehicle 1 after the control cycle Ts based on the signal from the vehicle wheel speed sensor 22 (S1208).

The position calculation unit 407 calculates a position error indicating a difference between the calculated target position and the actual position of the vehicle 1 (S1209).

The movement control unit 408 performs a PID control such that the position error occurring in S1209 is suppressed (S1210). Specifically, the movement control unit 408 derives an appropriate amount of operation for suppressing the position error in the PID control, and transmits the amount of operation to the brake system 18 or the like through the CAN communication.

Thereafter, the parking assistance device 400 determines whether or not the vehicle 1 arrives at the target parking position (S1211). If it is determined that the vehicle does not arrive at the target parking position (No in S1211), the processing starts again from the calculation of the target vehicle speed in the next control cycle (S1205).

On the other hand, if it is determined that the parking assistance device 400 arrives at the target parking position (Yes in S1211), the parking assistance device 400 ends the processing.

In the present embodiment, a movement control of the vehicle 1 to the target parking position is performed according to the automatic control by the parking assistance device 400 for steering, acceleration, and braking. In the flowchart described above, the steering control is assumed to be performed in the same manner as that in the related art, and the description thereof will be omitted.

Figure 13:
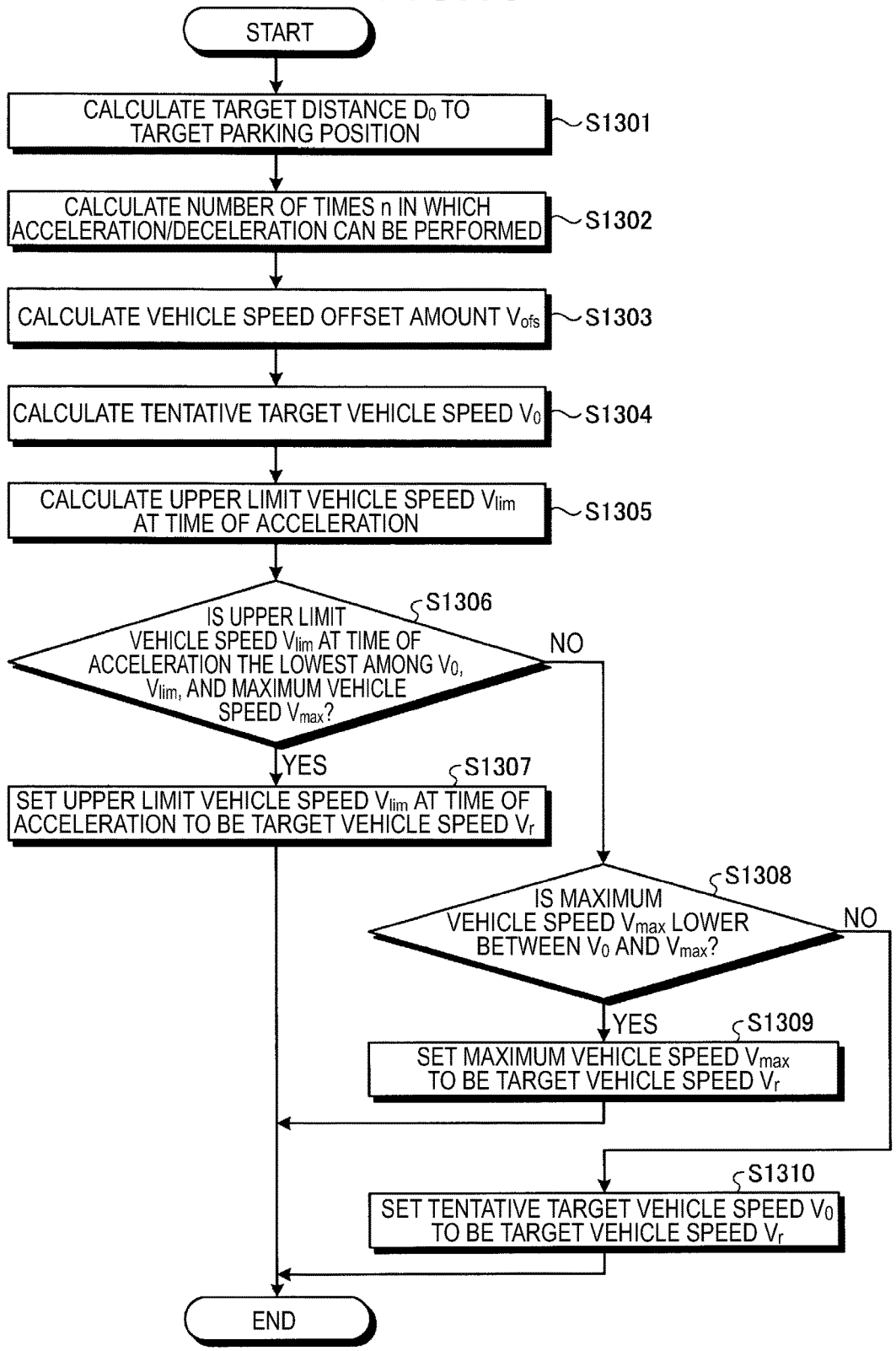
FIG. 13 is a flowchart illustrating a procedure of target vehicle speed calculation processing in the parking assistance device according to the embodiment.

Next, a method of calculating the target vehicle speed in S1205 will be described. FIG. 13 is a flowchart illustrating a procedure of the target vehicle speed calculation processing in the parking assistance device 400 according to the present embodiment.

First, the distance calculation unit 405 calculates a target distance $D_0$ in the moving route from the current position of the vehicle 1 to the target parking position based on the moving route generated by the route generation unit 404 and the current position of the vehicle 1 (S1301).

Next, the target vehicle speed calculation unit 406 calculates the number of times n in which the acceleration/deceleration can be performed using Equation (2) described above based on the target distance $D_0$, the set deceleration $a_{minus}$, and the control cycle Ts (S1302).

In addition, the target vehicle speed calculation unit 406 calculates the offset distance $D_{ofs}$ using Equation (4) described above based on the target distance $D_0$, the set deceleration $a_{minus}$, the control cycle Ts, and the number of times n, and then, calculates the vehicle speed offset amount $v_{ofs}$ using Equation (5) described above based on the offset distance $D_{ofs}$, the number of times n, and the control cycle Ts (S1303).

In addition, the target vehicle speed calculation unit 406 calculates the tentative target vehicle speed $V_0$ using Equation (6) described above based on the set deceleration $a_{minus}$, the number of times n, the control cycle Ts, and the vehicle speed offset amount $v_{ofs}$ (S1304).

Next, the target vehicle speed calculation unit 406 calculates the upper limit vehicle speed $V_{lim}$ at the time of acceleration based on the target vehicle speed $V_{old}$ calculated last time (in other words, previous control cycle Ts), the set acceleration $a_{plus}$, and the control cycle Ts, using Equation (7) described above (S1305).

The target vehicle speed calculation unit 406 determines whether or not the upper limit vehicle speed $V_{lim}$ at the time of acceleration is the lowest among the tentative target vehicle speed $V_0$, the upper limit vehicle speed $V_{lim}$ at the time of acceleration, and the maximum vehicle speed $V_{max}$ (S1306).

If it is determined that the upper limit vehicle speed $V_{lim}$ at the time of acceleration is the lowest (Yes in S1306), the target vehicle speed calculation unit 406 sets the upper limit vehicle speed $V_{lim}$ at the time of acceleration to be the target vehicle speed Vr (S1307).

On the other hand, if it is determined that the upper limit vehicle speed $V_{lim}$ at the time of acceleration is not the lowest (No in S1306), the target vehicle speed calculation unit 406 determines whether or not the maximum vehicle speed $V_{max}$ is low among the tentative target vehicle speed $V_0$ and the maximum vehicle speed $V_{max}$ (S1308).

If it is determined that the maximum vehicle speed $V_{max}$ is low (Yes in S1308), the target vehicle speed calculation unit 406 sets the maximum vehicle speed $V_{max}$ to be the target vehicle speed Vr (S1309).

If it is determined that the maximum vehicle speed $V_{max}$ is not low (in other words, the tentative target vehicle speed $V_0$ is low) (No in S1308), the target vehicle speed calculation unit 406 sets the tentative target vehicle speed $V_0$ to be the target vehicle speed Vr (S1310).

In the present embodiment, the target vehicle speed Vr is set according to the situation of the vehicle 1 by performing the above-described processing. Next, setting of the target vehicle speed according to the situation of vehicle 1 will be described.

Figure 14:
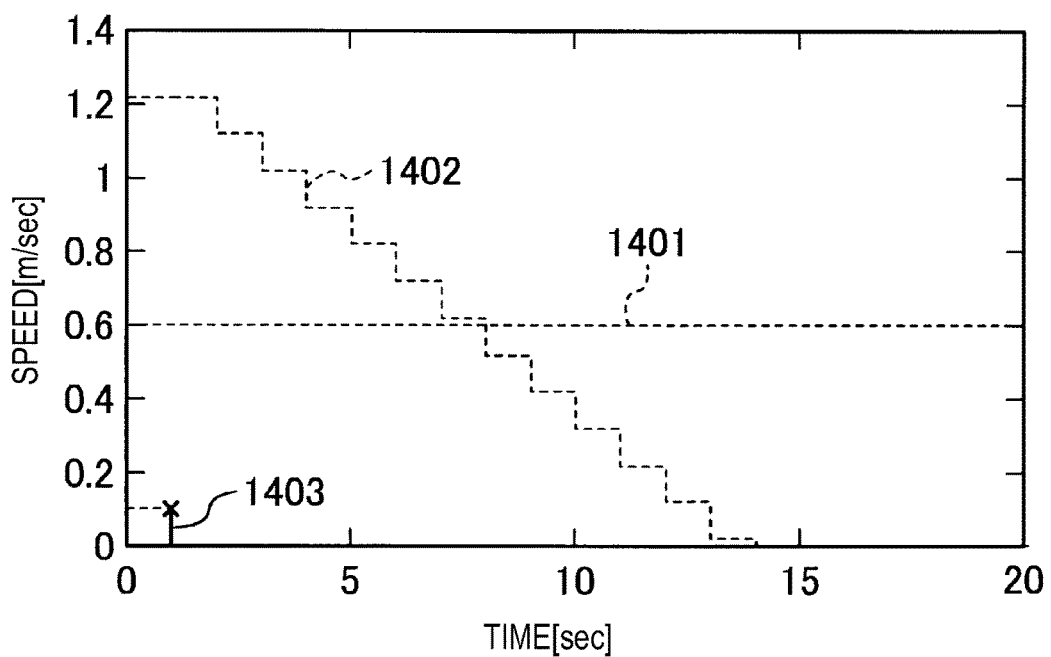
FIG. 14 is an exemplary diagram illustrating a situation of the vehicle at the time of starting the parking assistance.

FIG. 14 is an exemplary diagram illustrating a situation of the vehicle 1 at the time of starting the parking assistance. In the example illustrated in FIG. 14, a reference line 1401 indicating the maximum vehicle speed $V_{max}$, a change 1402 of the tentative target vehicle speed $V_0$, and a change 1403 of the target vehicle speed Vr are illustrated. In addition, the change 1402 of the tentative target vehicle speed $V_0$ decreases as the time elapses.

In the example illustrated in FIG. 14, the upper limit vehicle speed $V_{lim}$ at the time of acceleration has the lowest value among the upper limit vehicle speed $V_{lim}$ at the time of acceleration, the maximum vehicle speed $V_{max}$ and the tentative target vehicle speed $V_0$ calculated from the change 1403 of the target vehicle speed Vr. Therefore, at the time of acceleration of the vehicle 1, the upper limit vehicle speed $V_{lim}$ at the time of acceleration is set as the target vehicle speed Vr.

That is, if a constant deceleration control is performed, since the tentative target vehicle speed $V_0$ is the initial speed for just reaching the target parking position, the current situation of the vehicle 1 is not taken into consideration. Therefore, it is difficult to set the tentative target vehicle speed $V_0$ to be the vehicle speed of the vehicle 1 at the time of starting the parking assistance. Therefore, at the time of starting the parking assistance, a control for acceleration at the set acceleration $a_{plus}$ that can be output from the vehicle 1 is performed.

Figure 15:
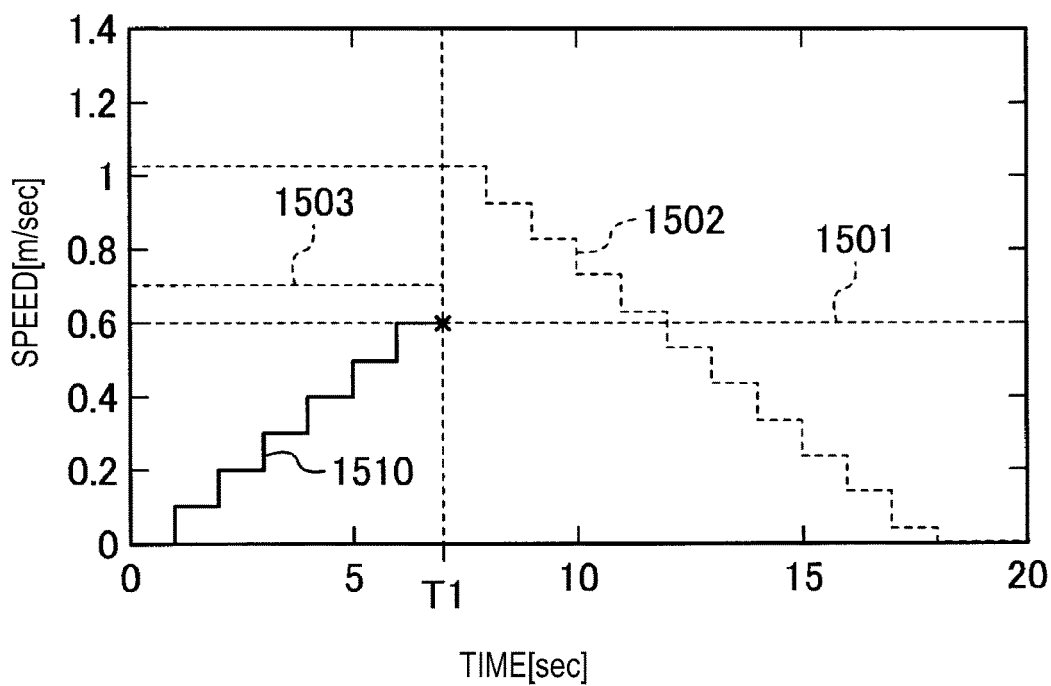
FIG. 15 is an exemplary diagram illustrating a situation of the vehicle at a normal-state section (time point T1) in the parking assistance.

FIG. 15 is an exemplary diagram illustrating a situation of the vehicle 1 at a normal-state section (time point T1) of the parking assistance. In the example illustrated in FIG. 15, a change 1510 of the target vehicle speed Vr, a reference line 1501 indicating the maximum vehicle speed $V_{max}$, a change 1502 of the tentative target vehicle speed $V_0$, and a reference line 1503 indicating the upper limit vehicle speed $V_{lim}$ of the time of acceleration, are illustrated. In the example illustrated in FIG. 15, the maximum vehicle speed $V_{max}$ has the lowest value among the upper limit vehicle speed $V_{lim}$ at the time of acceleration, the maximum vehicle speed $V_{max}$ and the tentative target vehicle speed $V_0$. Therefore, in the normal-state section, the maximum vehicle speed $V_{max}$ is set as the target vehicle speed Vr.

As described above, in the tentative target vehicle speed $V_0$, the current situation of the vehicle 1 is not taken into consideration. In the example illustrated in FIG. 15, the tentative target vehicle speed $V_0$ is assumed to be higher than the maximum vehicle speed $V_{max}$ that can be output by the vehicle 1 when the parking assistance is performed. In such a case, in the normal-state section, the control is performed such that the vehicle 1 moves at the maximum vehicle speed $V_{max}$.

Figure 16:
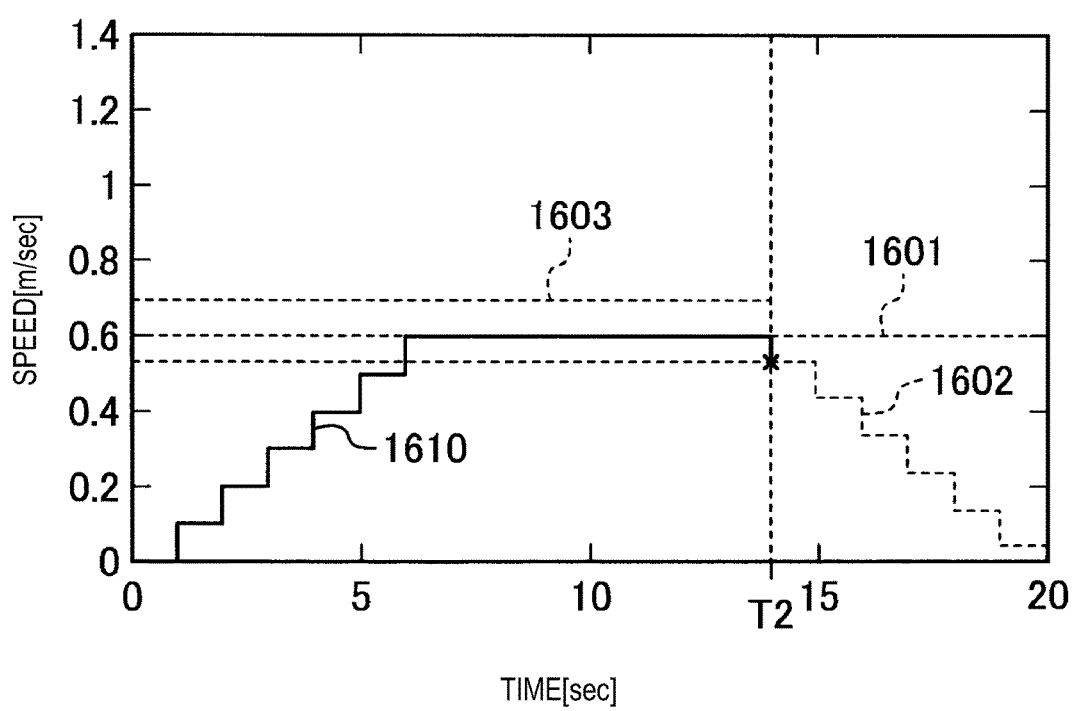
FIG. 16 is an exemplary diagram illustrating a situation of the vehicle at the time of deceleration (time point T2) in the parking assistance.

FIG. 16 is an exemplary diagram illustrating a situation of the vehicle at the time of deceleration (time point T2) in the parking assistance. In the example illustrated in FIG. 16, a change 1610 of the target vehicle speed Vr, a reference line 1601 indicating the maximum vehicle speed $V_{max}$, a change 1602 of the tentative target vehicle speed $V_0$, and a reference line 1603 indicating the upper limit vehicle speed $V_{lim}$ at the time of acceleration, are illustrated. In the example illustrated in FIG. 16, the tentative target vehicle speed V0 has the lowest value at time point T2 among the upper limit vehicle speed $V_{lim}$ at the time of acceleration, the maximum vehicle speed $V_{max}$ and the tentative target vehicle speed $V_0$. Therefore, after the time point T2, the tentative target vehicle speed $V_0$ is set as the target vehicle speed Vr. In other words, the deceleration of the vehicle 1 is started from the time point at which the tentative target vehicle speed $V_0$ becomes lower than the maximum vehicle speed $V_{max}$.

In the present embodiment, an example of using PID control for adjustment of the position error or the like is described, but it is not limited to a method using the PID control, and other control methods such as PI control may be used.

In the present embodiment, the example of guiding the vehicle 1 to the target parking position according to the moving route generated before the start of parking assistance is described. However, the generation of the moving route is not limited to the generation before starting the parking assistance. For example, the moving route for guiding the vehicle to the parking area detected from the data of captured image captured by the imaging unit 15 may be continuously updated in every control cycle Ts. In this case, the moving route is more accurately generated as the time elapses by generating the moving route for each control cycle Ts. In this way, it is possible to accurately stop the vehicle at the target parking position.

In addition, in the embodiment described above, an example is described, in which, when the vehicle is accelerated, the acceleration is restricted by providing the upper limit vehicle speed at the time of acceleration. Similarly, when the vehicle is decelerated, a deceleration lower limit acceleration may be provided to limit the deceleration.

In the parking assistance device 400 in the present embodiment, in the method of automatically controlling the vehicle 1 including the brake and the accelerator, the target vehicle speed Vr is calculated for each control cycle such that the vehicle stops at the target distance position, and then, the automatic control is performed. The parking assistance device 400 in the present embodiment sets a target vehicle speed according to the situation of the vehicle 1. In this way, the speed control according to the situation of the vehicle 1 can be realized.

Furthermore, in the embodiment described above, since the tentative target vehicle speed is adjusted for each control cycle based on the target distance, it is possible to stop the vehicle 1 within the parking area with high accuracy compared to a case in the related art. In addition, since the tentative target vehicle speed is adjusted in consideration of the target distance, it is possible to stop the vehicle within the parking area with high accuracy without reversing the deceleration the acceleration at the time of deceleration. In addition, since a control such as reversing the deceleration to the acceleration is not performed, it is possible to realize a control that does not give a discomfort or anxiety to the occupants.

A parking assistance device according to an aspect of this disclosure performs parking assistance when parking a vehicle in a parking area, and includes a speed calculation unit that calculates a first target vehicle speed for each control cycle indicating a cycle for calculating a target vehicle speed set as a target of a vehicle speed of the vehicle based on a target distance for the vehicle to move to a target position and the control cycle, the target position being included in the parking area, and a control unit that controls the vehicle such that the vehicle speed becomes the calculated first target vehicle speed for each control cycle. According to the configuration described above, it is possible to stop the vehicle within the parking area with high accuracy by, for example, controlling the vehicle such that the vehicle speed becomes the calculated first target vehicle speed.

In the parking assistance device according to the aspect of this disclosure, the speed calculation unit may calculate the first target vehicle speed for each control cycle based on the target distance, the control cycle, and a first deceleration set so as to be output by the vehicle when the parking assistance is performed. According to the configuration described above, it is possible to stop the vehicle within the parking area with high accuracy by, for example, controlling the vehicle such that the vehicle speed becomes the calculated first target vehicle speed.

In the parking assistance device according to the aspect of this disclosure, the speed calculation unit may calculate a movement distance to a stop position of the vehicle based on the first deceleration of the vehicle and the control cycle, calculate a vehicle speed offset amount for adjusting the vehicle speed of the vehicle in order to stop the vehicle at the target distance based on a difference between the target distance and the movement distance, and calculate the first target vehicle speed based on the vehicle speed offset amount, the first deceleration, and the control cycle. According to the configuration described above, it is possible to stop the vehicle within the parking area with high accuracy by, for example, controlling the vehicle such that the vehicle speed becomes the first target vehicle speed calculated in consideration of the difference between the target distance and the movement distance.

In the parking assistance device according to the aspect of this disclosure, the speed calculation unit may calculate a number of times of calculating the target vehicle speed during a period in which the vehicle moves to the target position based on the control cycle, the target distance, and the first deceleration, and calculate the first target vehicle speed by adding the vehicle speed to the vehicle speed offset amount, the vehicle speed being calculated based on the number of times, the control cycle, and the first deceleration. According to the configuration described above, it is possible to stop the vehicle within the parking area with high accuracy by, for example, controlling the vehicle such that the vehicle speed becomes the first target vehicle speed while considering the number of times of calculating the target vehicle speed and the vehicle speed offset amount.

In the parking assistance device according to the aspect of this disclosure, the speed calculation unit may set, as the vehicle speed used by the control unit for performing the control for each control cycle, the lowest vehicle speed among the first target vehicle speed, a maximum vehicle speed capable of being output when the parking assistance is performed, and an upper limit vehicle speed at the time of acceleration calculated based on the target vehicle speed calculated before the control cycle by the speed calculation unit and an acceleration capable of being output when the parking assistance is performed. According to the configuration described above, for example, since the vehicle speed is set corresponding to the situation of the vehicle, it is possible to stop the vehicle within the parking area with high accuracy.

A program according to an aspect of this disclosure causes a computer to execute a speed calculation step of calculating, when parking a vehicle in a parking area, a first target vehicle speed for each control cycle indicating a cycle for calculating a target vehicle speed set as a target of a vehicle speed of the vehicle based on a target distance for the vehicle to move to a target position and the control cycle, the target position being included in the parking area, and a control step of controlling the vehicle such that the vehicle speed becomes the calculated first target vehicle speed for each control cycle. According to the configuration described above, it is possible to stop the vehicle within the parking area with high accuracy by, for example, controlling the vehicle such that the vehicle speed becomes the calculated first target vehicle speed calculated in consideration of the difference between the target distance and the movement distance.

The embodiment of this disclosure is described, but the embodiment is presented as examples and is not intended to limit the scope of this disclosure. This novel embodiment can be embodied in various other forms, and various omissions, substitutions, and changes can be made without departing from the gist of this disclosure. This embodiment and its modifications are included in the scope and gist of this disclosure and are included in this disclosure described in the aspects and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device that performs parking assistance when parking a vehicle in a parking area, comprising:
a processor configured to
calculate a target vehicle speed for each control cycle indicating a cycle for calculating the target vehicle speed set as a target of a vehicle speed of the vehicle based on a target distance for the vehicle to move to a target position and the control cycle, the target position being included in the parking area; and
control the vehicle such that the vehicle speed becomes the calculated target vehicle speed for each control cycle,
wherein the target vehicle speed is calculated for each control cycle based on the target distance, the control cycle, and a deceleration set so as to be output by the vehicle when the parking assistance is performed,
wherein the processor is configured to calculate a movement distance to a stop position of the vehicle based on the deceleration of the vehicle and the control cycle, calculate a vehicle speed offset amount for adjusting the vehicle speed of the vehicle in order to stop the vehicle at the target distance based on a difference between the target distance and the movement distance, and calculate the target vehicle speed based on the vehicle speed offset amount, the deceleration, and the control cycle.

2. The parking assistance device according to claim 1, wherein the processor is configured to calculate a number of times of calculating the target vehicle speed during a period in which the vehicle moves to the target position based on the control cycle, the target distance, and the deceleration, and calculate the target vehicle speed by adding the vehicle speed to the vehicle speed offset amount, the vehicle speed being calculated based on the number of times, the control cycle and the deceleration.

3. The parking assistance device according to claim 1, wherein the processor is configured to set, as the vehicle speed used by the control unit for performing the control for each control cycle, the lowest vehicle speed among the target vehicle speed, a maximum vehicle speed capable of being output when the parking assistance is performed, and an upper limit vehicle speed at the time of acceleration calculated based on the target vehicle speed calculated before the control cycle by the speed calculation unit and an acceleration capable of being output when the parking assistance is performed.

4. A non-transitory computer readable medium recording a program that causes a computer to execute:
a speed calculation step of calculating, when parking a vehicle in a parking area, a target vehicle speed for each control cycle indicating a cycle for calculating a target vehicle speed set as a target of a vehicle speed of the vehicle based on a target distance for the vehicle to move to a target position and the control cycle, the target position included in the parking area; and
a control step of controlling the vehicle such that the vehicle speed becomes the calculated first target vehicle speed for each control cycle;
wherein the target vehicle speed is calculated for each control cycle based on the target distance, the control cycle, and a deceleration set so as to be output by the vehicle when the parking assistance is performed,
wherein a movement distance to a stop position of the vehicle is calculated based on the deceleration of the vehicle and the control cycle, a vehicle speed offset amount for adjusting the vehicle speed of the vehicle in order to stop the vehicle at the target distance is calculated based on a difference between the target distance and the movement distance, and the target vehicle speed is calculated based on the vehicle speed offset amount, the deceleration, and the control cycle.

* * * * *